UNITED STATES PATENT OFFICE.

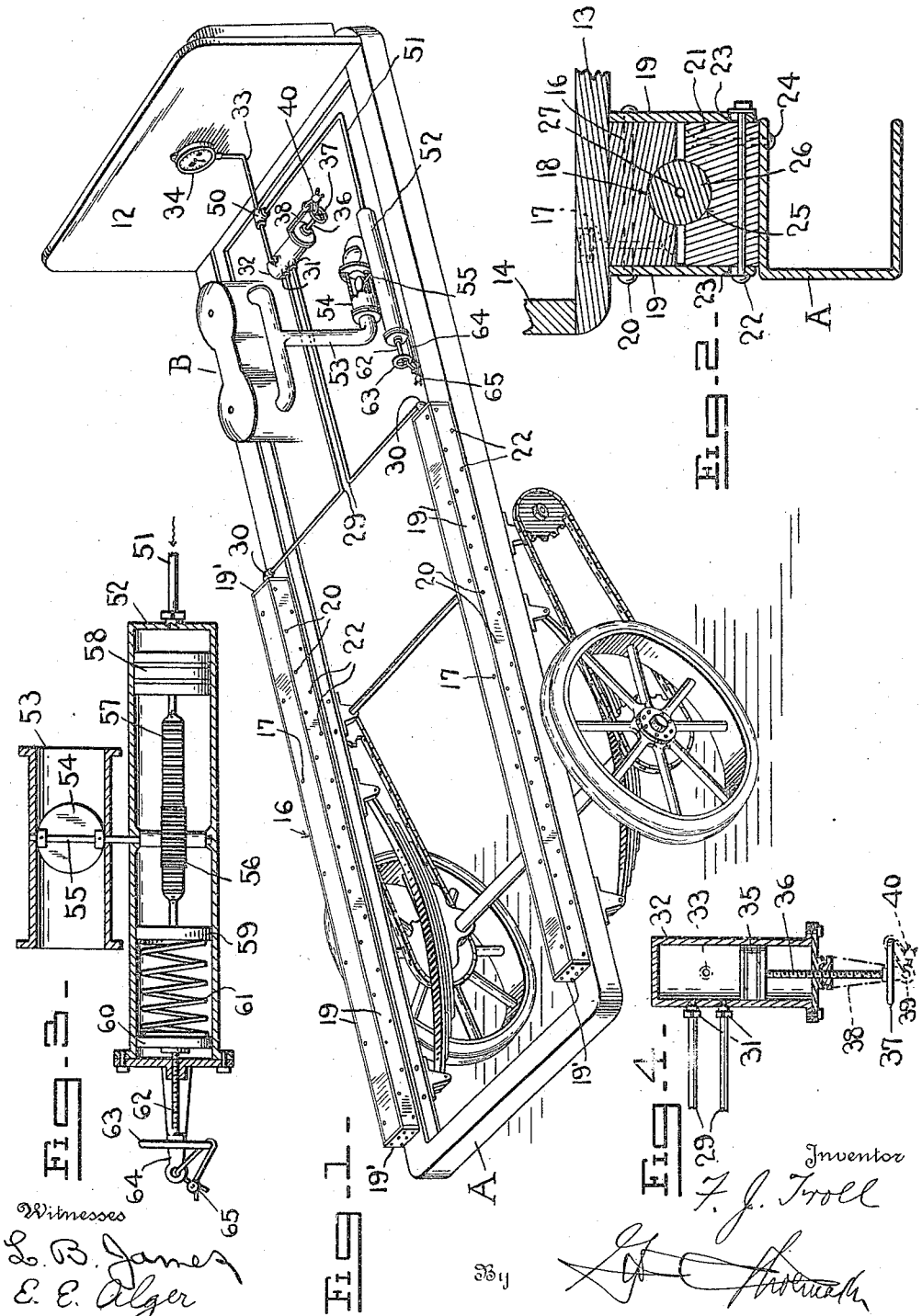

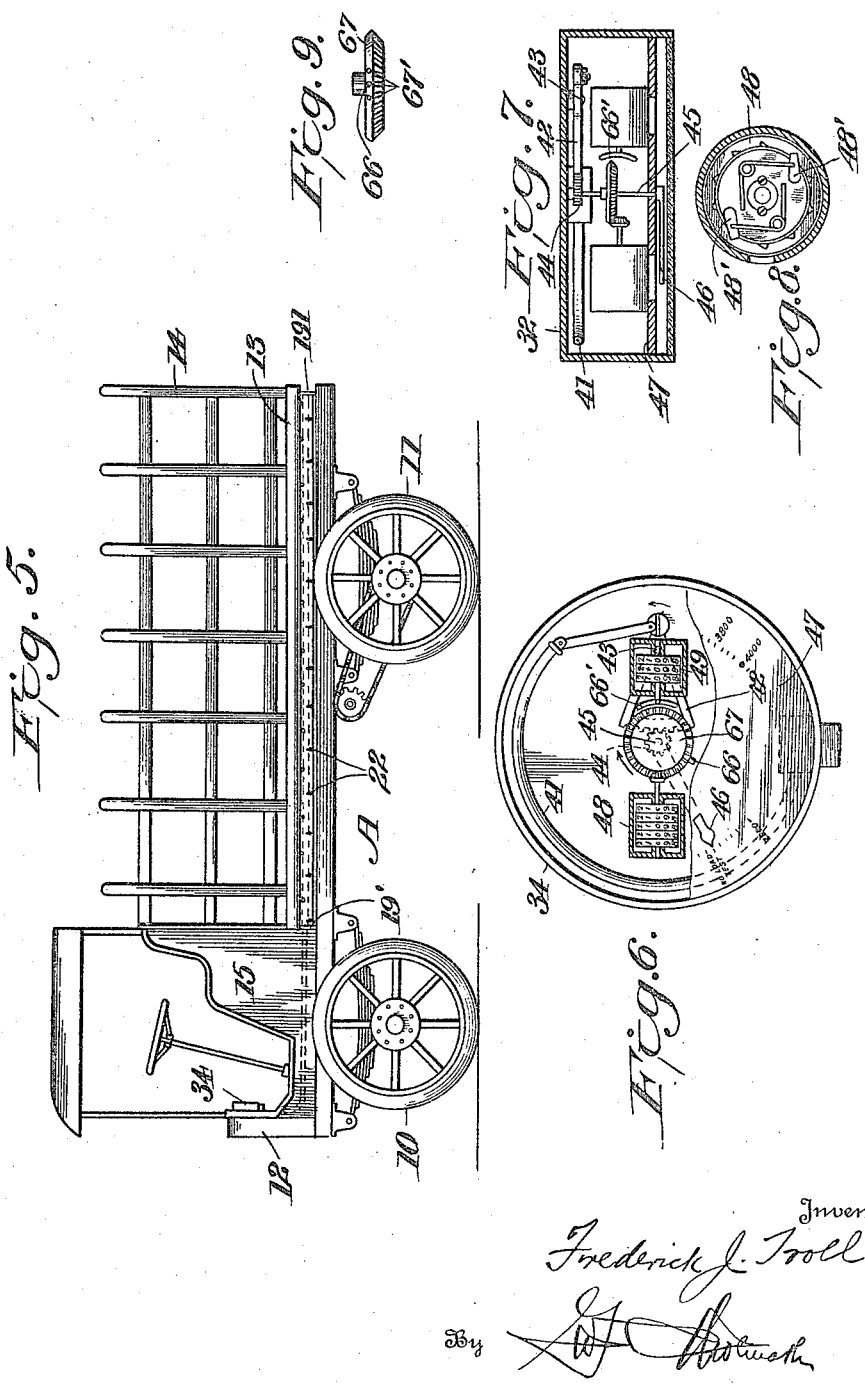

FREDERICK J. TROLL, OF BALTIMORE, MARYLAND, ASSIGNOR TO THE LOADOMETER COMPANY, OF BALTIMORE, MARYLAND, A CORPORATION OF DELAWARE.

LOAD-CONTROLLER FOR MOTOR-VEHICLES.

1,227,504.  Specification of Letters Patent.  Patented May 22, 1917.

Original application filed December 14, 1914, Serial No. 877,226. Divided and this application filed July 17, 1915. Serial No. 40,493.

*To all whom it may concern:*

Be it known that I, FREDERICK J. TROLL, a citizen of the United States, residing in the city of Baltimore and State of Maryland, have invented certain new and useful Improvements in Load-Controllers for Motor-Vehicles, of which the following is a specification.

This invention relates to a load indicator and controller for motor trucks and the like and may be termed a loadometer.

Motor trucks are sometimes equipped with a sign disposed at some convenient point on the vehicle indicating the pound capacity thereof. Warnings are also sometimes located on the vehicle to the effect that it should not be loaded to an extent beyond its rated carrying capacity, say for instance 3000 pounds. The reason for such notices and warnings is that overloads place the truck under unnecessary strain and impair the life of the truck. A cautious driver in some instances in his efforts to exercise extreme care may underload the truck, thereby reducing the operative efficiency by increasing the unit cost per pound of the material handled. Careless drivers are likely to overload the truck, thereby increasing the repair cost, tire expense, etc., with the result that from the manufacturer's viewpoint, the reputation of the truck is affected to the disadvantage of the manufacturer by reason of complaints from owners or purchasers of motor trucks.

It is therefore one object of my invention to provide means particularly adapted for application to motor trucks to indicate under loads and over loads in conjunction with means associated therewith to cut off the supply of driving medium to the driving means when a predetermined point beyond the rated load capacity has been reached so as to prevent operation of the driving means and consequent damage to the vehicle in the event of an overload and so that a cautious driver in the exercise of extreme care will not unknowingly underload the truck.

Another object resides in the provision of fluid pressure means which may be readily applied to a motor or other vehicle for automatically preventing the operation of the vehicle when overloaded.

With the above and other objects in view, the present invention consists in the combination and arrangement of parts to be hereinafter more fully described, illustrated in the accompanying drawings and particularly pointed out in the appended claims, it being understood that changes may be made in the form, proportion, size and minor details without departing from the spirit or sacrificing any of the advantages of the invention.

In the drawings:

Figure 1 is a perspective view of a portion of a vehicle illustrating my invention.

Fig. 2 is a fragmentary transverse sectional view through one side of the vehicle illustrating a portion of my invention.

Fig. 3 is a horizontal sectional view through a portion of the manifold intake pipe and the mechanism which is operated to automatically cut off the supply of operating fluid to the engine.

Fig. 4 is a horizontal sectional view through the means for automatically varying or adjusting the capacity of the fluid operating means.

Fig. 5 is a side elevation of the invention.

Fig. 6 is a front elevation of the gage with a part of the dial broken away.

Fig. 7 is a horizontal sectional view through the gage.

Fig. 8 is a transverse sectional view through one of the registering mechanisms illustrating the means for preventing backward movement of the registering disks.

Fig. 9 is a detail view of the driving gear of the gage illustrating the means for adjustably positioning the trip arm.

Referring now more particularly to the accompanying drawings the reference character A indicates the frame of the chassis of a motor or other truck which is supported upon front and rear wheels in the usual or any suitable manner, and to which the dash 12 may be secured. The platform or bottom 13 of the body 14 is shown as extending from the rear of the driver's seat 15 to the rear of the frame A.

Secured adjacent opposite sides of the under side of the bottom 13 of the truck are oppositely disposed upper sills 16. Any suitable securing means may be employed for this purpose but bolts 17 are effective for the performance of this function. These sills 16 preferably extend from the rear of the driver's seat to the rear end of the truck. In each sill there is formed a substantially semi-circular or other form of longitudinal groove 18 which extends throughout the length of each sill.

Plates 19 are secured by means of bolts or other suitable elements 20 to the side of each sill 16 and depend below the respective sills. The plates 19 are thus arranged in pairs, a pair being secured to each sill 16.

Fitted between each pair of plates 19 is a lower sill 21 which is preferably of the same length as the corresponding upper sill 16 and which is supported for vertical movement between the corresponding pair of plates 19 by means of bolts or other suitable elements 22 passing transversely therethrough and having movement at their ends in slots 23 formed at the lower edge of the plates 19. These lower sills 21 are secured by means of bolts or other suitable elements 24 to the chassis A so that the movements of the chassis A incident to uneven riding or jolting of the truck provides for a corresponding up and down movement of the sills 21 and, by virtue of the sills 16 being movable toward and away from the respective sills 21 under the influence of weight put on or taken off of the bottom 13 of the truck, there is consequent play between the respective upper and lower sills on opposite sides of the vehicle.

The upper face of each lower sill 21 is provided with a longitudinal recess 25 which extends throughout the length thereof and preferably of the same formation as the longitudinal recess 18 in the respective upper sills 16 and preferably disposed in vertical alinement with the latter. In the seats thus formed in the upper and lower sills 16 and 21 on each side of the truck I dispose rubber or other compressible, yieldable or resilient elements 26 which extend throughout the length of the respective sills. These resilient elements 26 each has a relatively small bore 27 which renders the same hollow without rendering the material thin between the bore and the outer circumference. These compressible elements, it will be seen, perform not only the function of forcing fluid under pressure to effect operation of the valve 54 in the intake manifold pipe 53, as will be later explained, but, by virtue of their particular formation serve also to support the body 14 yieldably on the chassis A independently of the common spring means employed on all vehicles to yieldably support the chassis frame and body.

Caps, plugs or other suitable elements may be employed to effectively close the outer ends of the compressible elements 26 in order to prevent escape of fluid which these compressible elements 26 are adapted to contain for purposes presently understood. The fluid may be air or liquid and, in any event, it is preferably of such nature as not to have an injurious effect on the compressible elements 26 as would tend to deteriorate or impair the life thereof. The compressible elements 26 are protected from the weather by reason of their location between the sills and said plates 19 and also by the end plates 19'.

To indicate underloading and overloading of the vehicle, metallic piping or flexible tubes 29 may be connected by means of suitable couplings 30 to the inner ends of the compressible elements 26. These connections 29 are connected by means of suitable couplings 31 with a fluid reservoir 32 located preferably near the front of the chassis. This reservoir 32 has pipe or other connection with a low pressure gage 34 mounted on the dash board 12. This gage 34 may be of any suitable character but preferably is of that variety of gage illustrated and described more or less in detail in my co-pending application filed December 14, 1914, Serial No. 877,226 and of which this is a divisional application. As pointed out in my aforesaid application, when there is fluid in the compressible members 26, compression of the latter causes the fluid therein, and also the fluid in the tubular members 29 and reservoir 32 and the pipe connection 33 to operate the bourdon tube 41 in the gage 34, which is connected to a segmental gear 42 by means of a connection 42' and which effects actuation of the segmental gear 42 on its pivot 43. This segmental gear 42 is in mesh with the pinion 44 on the indicator shaft 45, and when said segmental gear swings it causes said shaft 45 to rotate and consequently swing the hand 46 over the dial face 47 of the gage 34 and thereby indicate on the dial face the total pounds or amount of load in units as the load is placed on the truck. The dial of the gage gives the rated capacity, say for instance three thousand pounds, although it is preferably graduated to indicate a greater rate of pounds capacity as shown. It also includes a "zero" and a "no load test point". The hand indicator 46 should also point to this "no load test point" when the truck is unloaded. The fluid capacity of this reservoir 32 may be adjusted or varied as desired by means of a piston 35 mounted therein and provided with a screw threaded or other stem 36 which extends through one end of the reservoir. This screw threaded stem may be provided with a hand wheel or the like 37 which has openings therein. Extending from the reservoir 32 is an arm 38 provided at its outer end with an aperture 39 through which and one of the openings of the hand wheel 37 a seal 40 may be inserted for the purpose of locking the piston 35 in adjusted positions against manipulation and consequent adjustment by unauthorized persons. Any other suitable means may be employed for locking the piston 35 against unauthorized adjustment.

Under the action of weight placed on the truck the compressible elements 26 are depressed according to the weight and this depression of the vehicle body and the consequent compression of the compressible elements 26 causes the fluid therein and also the fluid in the tubular connections 29, the reservoir 32 and the pipe connection 33 to operate the gage 34 in the manner disclosed in my aforesaid copending application.

Should the truck be overloaded above a predetermined amount the supply of gas or other driving medium is automatically cut off from the engine to prevent operation of the same and a consequent movement of the truck. This automatic cut off of driving medium supplied to the engine may be accomplished when the gage 34, if employed in the system, has been operated by the overload to indicate the overloaded condition and one way for accomplishing this is by disposing a T-coupling 50 in the line of the tubular connection 33 between the reservoir 32 and the gage 34. There is maintained at all times an initial pressure on the system for should there be any leakage, the indicator hand would drop below the "no load test point" toward the "zero" point. Should there be an extra amount of pressure from some cause or other, the hand 46 would go above the "no load test point." The aforesaid adjustable reservoir 32 is provided for the purpose of adjusting the hand indicator so as to maintain the indicator hand pointing directly to the "no load test point" when the truck is unloaded. It might be mentioned at this point, for example, that if the truck has been loaded with 3,000 pounds to be carried to a certain point and then 1,000 pounds is removed from the truck, the indicator hand 46 will drop back to the 2,000 pound mark. Then, if the truck is sent to another place and it has 600 pounds taken on, the indicator hand 46 will then indicate 2,600 pounds. The additional 600 pounds and all loads taken on would be registered on a registering means including rotatable disks 48, held against backward movement, preferably by ratchets 48'. Should the truck be overloaded above a predetermined amount, say for instance, 1,000 pounds overload, which would cause the hand indicator 46 to indicate 4,000 pounds on the dial, this act of overloading would be registered on a register, including rotatable disks 49, held against backward movement by ratchets 48'. One way in which the times the truck has been overloaded may be indicated, is to provide the aforesaid beveled gear 67 with a projection or other tripping element 66 which is so disposed that when the gear 67 has been rotated to such an extent as to cause the indicator hand 46 to pass the predetermined amount of overload, as shown on dial 47, the trip 66 will engage the star wheel 66' and actuate the register mechanism 49, indicating thereon the number of times the truck has been overloaded. If desired, the beveled gear may have a plurality of screw-threaded holes 67' on its periphery so that the screw-threaded tripping element 66 may be disposed therein interchangeably whereby the trip will engage the star wheel 66' at different times according to the hole in which the trip is placed, whereby the amount of overload to be reached and indicated may be adjusted. By means of the ratchets 48' the registering disks of both registering mechanisms turn in one direction only under the action of registering the loads and overloads and cannot accidentally rotate backward.

A pipe coupling 51 has connection with the T-coupling 50 and with one end of the cylinder 52, which latter contains means operable under the influence of fluid pressure to operate means in the intake manifold 53 of the engine of the truck to automatically cut off the supply of driving medium to the cylinders of the engine. For instance, a butter-fly valve 54 is disposed in the manifold pipe 53 and has a shaft 55 journaled through the side of said cylinder 52 and to which shaft 55 and located within said cylinder 52 is a pinion 56 which is adapted to mesh with a rack 57 secured at one of its ends to a piston 58 which is slidable in the cylinder 52 under the action of fluid pressure entering the cylinder from the pipe 51. The outer end of the rack 57 is secured to a disk 59. Interposed between the disk 59 and a disk 60 in the cylinder 52 is a spring 61. The fluid pressure against the piston 58 acts against the tension of this spring 61 to cause the butter-fly valve 54 to close the manifold intake pipe 51 thereby shutting off the supply of gas to the engine and preventing movement of the truck.

The tension of the spring 61 may be increased or diminished by adjustment of the disk 60 toward and away from the disk 59, there being secured to the disk 60 a screw threaded rod 62 which operates through a screw threaded bore in the adjacent end of the cylinder 52. On the outer end of the screw threaded rod 62 is a hand wheel 63. The object of this arrangement is for the purpose of adjusting the predetermined amount of overload that may be placed on the truck which will operate to cut off the supply of gas to the engine. On the cylinder 52 is an arm 64 provided with an aperture through which and the hand wheel 63 a seal 65 may be passed to prevent unauthorized manipulation or adjustment of the disk 60. Any other locking means may be employed for the purpose.

From the foregoing it will be apparent that the capacity of the truck may be varied and that the weight on the truck incident to the materials or commodities placed thereon or removed therefrom will be indicated on the dial 47 of the gage 34. If the truck has the load capacity of, say for instance 3000 pounds, it will be apparent to the driver or other attendant when the maximum load capacity of the vehicle has been reached. If the driver or other attendant disregards the indication or warning given by the gage 34 when the maximum load capacity has been reached, the overloaded vehicle cannot be moved because the butterfly valve 54 will be operated at or slightly beyond the overloading point to cut off the gas supply to the engine so that the driver or other attendant cannot run the vehicle in an overloaded condition. This overloading of the vehicle not only prevents movement of the vehicle but the fact that the vehicle has been overloaded is indicated on the gage 34. It will be noted that the walls of the recesses in the sills 16 and 21 almost completely embrace the compressible members 26 and that incident to relative movements of the sills toward each other, undue lateral expansion of the compressible members is avoided. This is due to said recesses in the sills reinforcing the sides of the compressible members. The opposing inner faces of the sills on opposite sides of their recesses, upon coming together, limit and prevent further expansion and compression of the compressible members. This degree of expansion or compression is also limited by engagement of the bolts 22 with the upper ends of the slots 23 in the plates 19 or the bolts 22 and the slots 23 may coact with the opposing inner faces of the sills in the performance of this function. The main object of preventing or limiting the degree of compression or expansion of the compressible members beyond a predetermined point, is to obviate undue stress and wear on the compressible members, the latter being constructed as to need but slight compression to effect practical operation of my appliance.

What is claimed is:—

1. The combination of a vehicle chassis, a body mounted thereon, driving means for the vehicle, fluid pressure means carried by the vehicle to indicate when a predetermined load capacity has been reached, and means operable by said fluid pressure means to cut off the driving power of the vehicle when the predetermined load capacity has been reached.

2. The combination of a vehicle chassis, a body on the chassis, an engine including a manifold intake pipe, means carried by the vehicle to indicate when a predetermined load capacity of the vehicle has been reached, a cylinder carried by the vehicle, a valve disposed in said manifold intake, and means mounted in said cylinder and having operative connection with said valve and said indicating means to operate the valve and close said manifold intake when the predetermined load capacity of the vehicle has been reached.

3. The combination of a vehicle chassis, a body on the chassis, and an engine including a manifold intake pipe, of means to cut off the supply of operating fluid to the engine when the maximum load capacity of the vehicle has been reached comprising a valve disposed in the manifold intake, a fluid containing, compressible, operating member interposed between the chassis and the body, said member having walls formed of a thickness to support the body in spaced relation to the chassis in the absence of fluid in said member, a cylinder carried by the vehicle, and means mounted in said cylinder and having operative connection with said valve and operable under the influence of said fluid containing, compressible, element to operate the valve and close said manifold intake when the maximum load capacity of the vehicle has been reached.

4. The combination of a vehicle chassis, an engine carried by the chassis and including a manifold intake pipe, a gage carried by the vehicle, means carried by the vehicle and operable under the influence of weight placed thereon to actuate the gage to indicate the amount of load placed on the vehicle, a valve in the intake pipe of the engine, and means operatively connected to the gage actuating means and the valve to automatically actuate said valve to cut off the supply of driving medium to the engine through said manifold intake pipe and thereby prevent driving the vehicle when the same has been overloaded.

5. The combination of a motor driven vehicle including the engine for driving the same and the intake pipe of the engine, of means carried by the vehicle to indicate the weight of loads placed thereon, a valve in the intake pipe of the engine, a cylinder carried by the vehicle, and means confined within said cylinder and having operative connection with said valve to operate the latter to cut off the supply of driving medium through said intake pipe when the predetermined load capacity of the vehicle has been reached.

6. The combination with a motor driven vehicle including the engine for driving the same and the intake pipe to the engine, of means carried by the vehicle to indicate the weight of loads placed thereon, a valve in the intake pipe of the engine, a cylinder carried by the vehicle, a piston slidable in the cylinder, a rack connected to the piston and having operative connection with said valve so that when the predetermined load capacity of the vehicle has been reached the piston may operate to shift said rack and thereby operate said valve to cut off the supply of driving medium through said intake pipe to the engine and thereby prevent operation of the engine.

7. The combination of a motor driven vehicle, including the engine for driving the same and the intake pipe to the engine, of means carried by the vehicle to indicate the weight of loads placed thereon, a valve in the intake pipe of the engine, a cylinder carried by the vehicle, a spring controlled movable piston in said cylinder having operative connection with said valve, and a connection between said cylinder and said weight indicating means whereby when the predetermined load capacity of the vehicle has been reached the piston will be operated in said cylinder to actuate said valve and cut off the supply of driving medium through said intake pipe to prevent operation of the engine and consequent movement of the vehicle.

8. The combination with a vehicle chassis, a body on the chassis, a driving means for the vehicle, means on the vehicle to indicate when a predetermined load capacity has been reached, of means to prevent operation of the driving means comprising an operatively, compressible, supporting member interposed between the chassis and the body and constructed to contain an incompressible liquid, said member having walls formed of a thickness to support the body in spaced relation to the chassis independently of the presence of liquid in said member and having operative connection with the driving means.

9. The combination of a vehicle chassis, a body mounted thereon, means for driving the vehicle including an engine having a valved intake pipe, fluid pressure means interposed between the chassis and the body, a cylinder carried by the vehicle, a piston movable in the cylinder, an operative connection between the piston and the valve of the valved intake pipe, and connections between the fluid pressure means and said cylinder to move said piston and thereby actuate the valve in the valved intake pipe to cut off the supply of driving medium to the engine.

10. The combination of a vehicle chassis, a body mounted thereon, an engine for driving the vehicle including a valved intake pipe, fluid pressure means interposed between the chassis and the body, means carried by the vehicle and constructed to receive pressure from said fluid pressure means, and having operative connection with the valve in the valved intake pipe so that under the influence of pressure from said fluid pressure means incident to a predetermined amount of weight placed on the body of the vehicle the valve in the valved intake pipe will be operated to cut off the supply of driving medium through the intake pipe to prevent movement of the vehicle while the predetermined load remains on the body of the vehicles.

11. The combination with a chassis, a vehicle body, and means for driving the vehicle, of means for preventing operation of the driving means when the maximum load capacity of the vehicle has been reached comprising an operatively, compressible, supporting member interposed between the chassis and the body and constructed to contain an incompressible liquid, said member being operatively connected to the driving means and having walls formed of a thickness to support the body in spaced relation to the chassis independently of the presence of fluid in said member.

12. The combination with a chassis, a vehicle body, and a driving means for the vehicle, of means for preventing operation of the driving means when a maximum load capacity of the vehicle has been reached comprising a fluid containing operating member interposed between the chassis and the body and connected to the driving means and operable to varying degrees of compression according to loads placed on the body, said member being capable of supporting the body under the same varying degrees of compression as aforesaid, incident to varying loads in the absence of fluid in said member.

13. The combination of a vehicle chassis, means for driving the vehicle including an engine having a valved intake pipe, fluid pressure means carried by the chassis, means for adjusting the capacity of the fluid pressure means, a cylinder carried by the vehicle, a piston movable in the cylinder, an operative connection between the piston and the valve of the valved intake pipe, adjustable yieldable means opposing movement of the piston, and connections between the fluid pressure means and said cylinder whereby movement of the piston may be effected against action of said adjustable yieldable means to actuate the valve in the valved intake pipe and thereby cut off the supply of driving means to the engine.

14. The combination with a chassis, a vehicle body, and a driving means for the vehicle, of means for preventing operation of the driving means when the maximum load capacity of the vehicle has been reached comprising a plurality of fluid containing, compressible, operating members arranged between the chassis and the body and connected to the driving means, said members each having walls constructed to support the body in operative position on the chassis independently of the presence of fluid therein.

15. The combination of a vehicle and means to drive the same, fluid pressure means carried by the vehicle to indicate when a predetermined load capacity has been reached, a cylinder carried by the vehicle, a piston in the cylinder, means leading from the fluid means to convey fluid under pressure into the cylinder against the piston to move the latter, and means between the cylinder and the driving means to prevent operation of the latter when the piston is moved as aforesaid.

16. The combination of a vehicle including a chassis frame and a body, means for yieldably supporting the frame and body, the body being subject to depression under the influence of weight placed thereon, fluid pressure means arranged between the frame and the body to yieldably support the latter on the frame against weight placed on the body independently of the first mentioned yieldable supporting means, means for driving the vehicle, and means carried by the vehicle and located between the fluid pressure means and the driving means for actuation under the influence of the fluid pressure means to prevent operation of the driving means.

17. The combination with a chassis, a vehicle body and a driving means for the vehicle, of means for preventing operation of the driving means when a predetermined load capacity of the vehicle has been reached comprising a fluid containing, compressible, operating member interposed between the chassis and the body, said member being connected to the driving means and having walls constructed to support the body in operative position on the chassis in the absence of fluid in said member, and means for inclosing said compressible, operating member.

18. The combination of a vehicle chassis, a body on the chassis, means for driving the vehicle, and fluid pressure means to prevent operation of the driving means of the vehicle including a fluid containing compressible body supporting member disposed between the chassis and the vehicle body.

19. The combination of a vehicle chassis, a body on the chassis, means for driving the vehicle, and fluid pressure means to prevent operation of the driving means including a fluid containing compressible body supporting member disposed between the chassis and the body and constructed to support the body in normal position on the chassis independently of fluid in said member.

20. The combination of a vehicle chassis, a body on the chassis, a driving means for the vehicle, and means to prevent operation of the driving means having as one element thereof a fluid containing, compressible, body-supporting member disposed between the chassis and the body and constructed to adequately support the body independently of operative connection with the means which prevents operation of the driving means.

21. The combination of a vehicle chassis, a body on the chassis, a driving means for the vehicle, means to prevent operation of the driving means having as one element thereof, a fluid containing, compressible, body-supporting member disposed between the chassis and the body and constructed to adequately support the body independently of operative connection with the means which prevents operation of the driving means, and means controlled by said compressible member for actuating the means which prevents operation of the driving means.

22. The combination of a vehicle chassis, means for yieldably supporting the chassis, a body on the chassis, a means for driving the vehicle, and means independent of said yieldable supporting means for preventing operation of the driving means having as one element thereof a compressible body-supporting member disposed between the chassis and the vehicle body.

23. The combination of a vehicle chassis, means for yieldably supporting the chassis, a body on the chassis, means for driving the vehicle, and means independent of said yieldable supporting means for preventing operation of the driving means including a compressible body-supporting member disposed between the chassis and the body, and means controlled by said compressible member for actuating the means which prevents operation of the driving means.

24. The combination of a vehicle chassis, a body on the chassis, means for driving the vehicle, fluid pressure means to prevent operation of the driving means of the vehicle including a fluid containing, compressible member disposed between the chassis and the vehicle body and means interposed between the chassis and body for the support of said compressible member and constructed whereby the degree of compression of the compressible member is limited.

25. The combination of a vehicle chassis, a body on the chassis, means for driving the vehicle, fluid pressure means to prevent operation of the driving means of the vehicle including a fluid containing, compressible member disposed between the chassis and the vehicle body, and means interposed between the chassis and body for the support of said compressible member and constructed whereby the degree of compresion of the compressible member is limited, said compressible member being constructed to yieldably support the body independently of the presence of fluid therein.

26. The combination of a vehicle chassis and a body, upper and lower members interposed between the chassis and the body, said members being movable relative to each other and having opposing recesses in their inner faces, means for driving the vehicle and means to prevent operation of the driving means of the vehicle including a compressible member interposed between said upper and lower members and located in and almost completely embraced by said recesses of said upper and lower members, and means whereby the degree of compression of said compressible member is limited beyond a predetermined point.

27. The combination of a vehicle including a chassis and a body, means for driving the vehicle, a fluid operated means to prevent operation of the driving means, and a fluid containing, operating compressible member interposed between the chassis and body to yieldably support the body, said compressible member being constructed to yieldably support the upper member independently of the presence of fluid therein.

28. The combination of a vehicle including a body and a chassis, means to drive the vehicle, means to prevent operation of the driving means, upper and lower sills interposed between the body and the chassis the opposing faces of the sills having recesses, and a fluid containing, operating compressible member interposed between said sills and located in the recesses of the latter and compressible under the influence of weight placed on the body to actuate the means which prevents operation of the driving means, said compressible member being constructed to yieldably support the upper member independently of the presence of fluid therein.

29. The combination of a vehicle including a body and a chassis, means for yieldably supporting the chassis, a driving means for the vehicle, and means independent of said yieldable supporting means for preventing operation of the driving means having as elements thereof compressible body supporting members interposed between the chassis and the vehicle body.

30. The combination of a vehicle including a body and a chassis, means for yieldably supporting the chassis, means for driving the vehicle, means independent of said yieldable supporting means for preventing operation of the driving means including a relatively long compressible body supporting member disposed between the chassis and the body, and means controlled by said compressible member for actuating the means which prevents operation of the driving means.

31. The combination of a vehicle including a body and a chassis, means for driving the vehicle, means to indicate the weight of loads placed on the vehicle, means operatively connected to the indicating means to indicate the number of times the vehicle is overloaded, said indicating means including a compressible member interposed between the body and the chassis, and means actuated by said compressible member to prevent operation of the driving means of the vehicle when the predetermined load capacity of the vehicle has been reached.

32. The combination of a vehicle including a chassis and a body, an indicating means including a device to indicate when the weight capacity of the vehicle has been reached, a device to indicate the total weight carried by the vehicle and a device to indicate the number of times the vehicle is overloaded, said indicating means also including a compressible actuating member interposed between the body and the chassis, a driving means for the vehicle, and means actuated by said compressible member to prevent operation of the driving means when the predetermined load capacity of the vehicle has been reached.

33. The combination of a vehicle including a chassis and a body, an indicating means including a device to indicate when the weight capacity of the vehicle has been reached, a device to indicate the total weight carried by the vehicle, and a compressible member interposed between the body and the chassis to operate said indicating means, means for driving the vehicle, and means operatively connected to said compressible member and actuated thereby to prevent operation of the driving means when the predetermined weight capacity of the vehicle has been reached.

34. The combination of a vehicle including a chassis and a vehicle body, an indicating means including a device to indicate when the weight capacity of the vehicle has been reached and a device to indicate the number of times the vehicle is overloaded, a compressible member interposed between the chassis and the body to operate said indicating means, means to drive the vehicle, and means operatively connected to said compressible member and actuated thereby to prevent operation of the driving means when the predetermined weight capacity of the vehicle has been reached.

35. The combination of a vehicle including a body and a chassis and means for driving the vehicle, of a compressible member interposed between the body and the chassis and operatively connected to the driving means to prevent operation of the latter when the vehicle is overloaded, and means for inclosing the compressible member.

36. The combination of a vehicle including a body and a chassis and means for driving the vehicle, of a compressible member interposed between the body and the chassis and operatively connected to the driving means to prevent operation of the latter when the vehicle is overloaded, and means for inclosing the compressible member and including means whereby the degree of compression of the compressible member is limited.

In testimony whereof I affix my signature in the presence of two witnesses.

FREDERICK J. TROLL.

Witnesses:
 JOHN H. SIGGERS,
 GEO. C. SHOEMAKER.

Copies of this patent may be obtained for five cents each, by addressing the "Commissioner of Patents, Washington, D. C."